(12) United States Patent
Ng et al.

(10) Patent No.: US 8,998,490 B2
(45) Date of Patent: Apr. 7, 2015

(54) CLAM SHELL LINEAR MOTION BEARING ASSEMBLY

(75) Inventors: Alison Ng, New York, NY (US); Ryan Thomas, Grand Blanc, MI (US)

(73) Assignee: Thomson Industries, Inc., Amherst, NY (US)

( * ) Notice: Subject to any disclaimer, the term of this patent is extended or adjusted under 35 U.S.C. 154(b) by 0 days.

(21) Appl. No.: 13/814,830

(22) PCT Filed: Aug. 10, 2011

(86) PCT No.: PCT/US2011/047182
§ 371 (c)(1),
(2), (4) Date: Apr. 12, 2013

(87) PCT Pub. No.: WO2012/021579
PCT Pub. Date: Feb. 16, 2012

(65) Prior Publication Data
US 2013/0209009 A1   Aug. 15, 2013

Related U.S. Application Data

(60) Provisional application No. 61/372,565, filed on Aug. 11, 2010.

(51) Int. Cl.
*F16C 29/06* (2006.01)
*F16C 35/00* (2006.01)

(52) U.S. Cl.
CPC ............ *F16C 29/0607* (2013.01); *F16C 35/00* (2013.01); *F16C 29/069* (2013.01)

(58) Field of Classification Search
CPC ..... F16C 29/0607; F16C 29/069; F16C 35/06

USPC ................ 384/43, 44, 45, 49; 74/502, 502.3; 29/898.03

See application file for complete search history.

(56) References Cited

U.S. PATENT DOCUMENTS

| 3,330,606 | A | * | 7/1967 | Minoru ............................ 384/43 |
| 4,456,312 | A | * | 6/1984 | Rogers et al. .................... 384/43 |
| 4,480,879 | A | * | 11/1984 | Reith et al. ....................... 384/45 |
| 4,789,249 | A | * | 12/1988 | Mutolo ............................. 384/43 |
| 4,952,075 | A | * | 8/1990 | Rogers, III ...................... 384/43 |
| 5,145,260 | A | * | 9/1992 | Edelmann et al. ............... 384/43 |
| 5,184,898 | A | * | 2/1993 | Kito ................................. 384/43 |

(Continued)

FOREIGN PATENT DOCUMENTS

| DE | 3911914 A1 | 10/1990 |
| WO | 9701713 A1 | 1/1997 |

(Continued)

*Primary Examiner* — Marcus Charles
(74) *Attorney, Agent, or Firm* — Dilworth & Barrese, LLP

(57) ABSTRACT

A linear motion bearing assembly comprising a rolling element retainer structure and an outer housing sleeve enclosing substantially all of an exposed exterior surface of said rolling element retainer structure. A bearing block effective to enclose substantially all of an exposed exterior surface of the outer housing sleeve, the bearing block including a first bearing block segment effective to enclose a first part of the outer housing sleeve; and a second bearing block segment effective to enclose a second part of the outer housing sleeve, wherein the first bearing block segment and the second bearing block segment include first elements and second elements effective to interlock with each other when the bearing block encloses the outer housing sleeve.

10 Claims, 8 Drawing Sheets

(56) References Cited

U.S. PATENT DOCUMENTS

| | | | |
|---|---|---|---|
| 5,346,313 A * | 9/1994 | Ng | 384/43 |
| 5,558,442 A * | 9/1996 | Ng | 384/43 |
| 5,613,780 A * | 3/1997 | Ng | 384/43 |
| 5,829,882 A * | 11/1998 | Ng et al. | 384/43 |
| 6,174,084 B1 * | 1/2001 | Pauwels et al. | 384/43 |
| 6,174,086 B1 * | 1/2001 | Ng et al. | 384/49 |
| 6,186,664 B1 * | 2/2001 | Yamazaki et al. | 384/43 |
| 6,481,892 B1 * | 11/2002 | Agostini | 74/502 |
| 6,619,844 B1 * | 9/2003 | Baalmann et al. | 384/43 |
| 6,908,228 B2 * | 6/2005 | Dalessandro et al. | 384/44 |
| 8,317,397 B2 * | 11/2012 | Klein | 384/49 |
| 2002/0067868 A1 | 6/2002 | Lyon et al. | |

FOREIGN PATENT DOCUMENTS

| | | | | |
|---|---|---|---|---|
| WO | WO 0025034 A9 * | 9/2000 | | F16C 33/05 |
| WO | WO 02055895 A1 * | 7/2002 | | F16C 29/06 |

\* cited by examiner

CLAM SHELL LINEAR MOTION BEARING ASSEMBLY

CROSS REFERENCE TO RELATED APPLICATIONS

This application claims priority to provisional application No. 61/372,565 filed Aug. 11, 2010 entitled "CLAM SHELL LINEAR MOTION BEARING ASSEMBLY", the entirety of which is hereby incorporated by reference.

BACKGROUND OF THE INVENTION

This disclosure relates to a linear bearing. In a linear motion bearing, a generally cylindrical housing is designed to move relative to a shaft. The housing includes a load bearing plate structure comprising a plurality of rolling element retaining segments. Each rolling element retaining segment includes a plurality of rolling element bearings moveable in a track. The segments are mounted within the housing so that movement of the housing with respect to the shaft is effectuated through engagement of the bearings with the shaft. As the housing moves, the rolling element bearings move in respective tracks. This disclosure describes an improvement on these prior art systems.

SUMMARY OF THE INVENTION

One embodiment of the invention includes a linear motion bearing assembly. The linear motion bearing assembly comprises a rolling element retainer structure, the rolling element retainer structure including a plurality of rolling element retainer segments. Each of the rolling element retainer segments including an inner portion defining at least one rolling element track having an open load bearing portion, an open return portion, and turnarounds interconnecting the load bearing and return portions. The linear motion bear assembly further comprises a plurality of bearing rolling elements disposed in the rolling element tracks, the rolling elements effective to transmit a load from a shaft to load bearing plates and to facilitate a movement of the linear motion bearing assembly along the shaft, and the load bearing plates positioned axially positioned adjacent to each rolling element retainer structure, the load bearing plates effective to receive a load from the rolling elements disposed in the load bearing portion of the rolling element tracks. The linear motion bear assembly further comprises an outer housing sleeve enclosing substantially all of an exposed exterior surface of the rolling element retainer structure, the outer housing sleeve having an inner surface in direct contact with the load bearing plates, the outer housing sleeve being configured and dimensioned to maintain the load bearing plates in position and effective to receive load from the load bearing plates. The outer housing sleeve including a first sleeve portion including a first number of the rolling element retainer segments; and a second sleeve portion including a second number of the rolling element retainer segments. The first sleeve portion is effective to mate with the second sleeve portion to form the outer housing sleeve.

Another embodiment of the invention includes a linear motion bearing assembly. The linear motion bear assembly comprises a shaft and a rolling element retainer structure effective to move along the shaft, the rolling element retainer structure including a plurality of rolling element retainer segments, each of the rolling element retainer segments including an inner portion defining at least one rolling element track having an open load bearing portion, an open return portion, and turnarounds interconnecting the load bearing and return portions. The linear motion bear assembly further comprises a plurality of bearing rolling elements disposed in the rolling element tracks, the rolling elements effective to transmit a load from a shaft to load bearing plates and to facilitate a movement of the linear motion bearing assembly along the shaft, and the load bearing plates positioned axially positioned adjacent to each rolling element retainer structure, the load bearing plates effective to receive a load from the rolling elements disposed in the load bearing portion of the rolling element tracks. The linear motion bear assembly further comprises an outer housing sleeve enclosing substantially all of an exposed exterior surface of the rolling element retainer structure, the outer housing sleeve having an inner surface in direct contact with the load bearing plates, the outer housing sleeve being configured and dimensioned to maintain the load bearing plates in position and effective to receive load from the load bearing plates. The outer housing sleeve including a first sleeve portion including a first number of the rolling element retainer segments; and a second sleeve portion including a second number of the rolling element retainer segments. The first sleeve portion is effective to mate with the second sleeve portion to form the outer housing sleeve. The linear motion bear assembly further comprises a bearing block effective to enclose substantially all of an exposed exterior surface of the outer housing sleeve, the bearing block including a first bearing block segment effective to enclose a first part of the outer housing sleeve; and a second bearing block segment effective to enclose a second part of the outer housing sleeve. The first bearing block segment and the second bearing block segment include first elements and second elements effective to interlock with each other when the bearing block encloses the outer housing sleeve. The first element includes a mortise and the second element includes a tenon. The first bearing block segment includes a tie rod hole, a tie rod, and a nut. The first and second sleeve portions are substantially identical. The first sleeve portion is mated with the second sleeve portion through a protuberance and a hole. The first and second sleeve portions have a first exterior cross-section. The bearing block segments include a second interior cross-section. The first cross-section section is sized and shaped so as to mate with the second cross-section. The first and second cross-sections each define a cylinder.

Yet another embodiment of the invention is a method of assembling a linear motion bearing assembly. The method comprises placing a rolling element retainer structure in an outer housing sleeve, the rolling element retainer structure including a plurality of rolling element retainer segments, each of the rolling element retainer segments including an inner portion defining at least one rolling element track having an open load bearing portion, an open return portion, and turnarounds interconnecting said load bearing and return portions. A plurality of bearing rolling elements disposed in the rolling element tracks, the rolling elements effective to transmit a load from a shaft to the load bearing plate and to facilitate a movement of the linear motion bearing assembly along the shaft, the load bearing plates positioned axially positioned adjacent to each rolling element retainer structure, the load bearing plates effective to receive a load from the rolling elements disposed in the load bearing portion of the rolling element tracks. The outer housing sleeve enclosing substantially all of an exposed exterior surface of the rolling element retainer structure, the outer housing sleeve having an inner surface in direct contact with the load bearing plates, the outer housing sleeve being configured and dimensioned to maintain the load bearing plates in position and effective to receive load from the load bearing plates. The outer housing sleeve including a first sleeve portion including a first number of the rolling element retainer segments; and a second sleeve portion including a second number of the rolling element retainer segments. The first sleeve portion is effective to mate with the second sleeve portion to form the outer housing sleeve. The method further comprises placing the outer housing sleeve in a bearing block, the bearing block effective to enclose substantially all of an exposed exterior surface of the outer housing sleeve. The bearing block including a first bearing block segment effective to enclose a first part of the outer housing sleeve; and a second bearing block segment effective to enclose a second part of the outer housing sleeve. The first bearing block segment and the second bearing block segment include first elements and second elements effective to interlock with each other when the bearing block encloses the outer housing sleeve.

BRIEF DESCRIPTION OF THE DRAWINGS

The accompanying drawings, referred to herein and constituting a part hereof, illustrate the preferred embodiments of the bearing assembly of the present invention and, together with the description, serve to explain the principles of the invention.

DETAILED DESCRIPTION OF PREFERRED EMBODIMENTS

Figure 1:
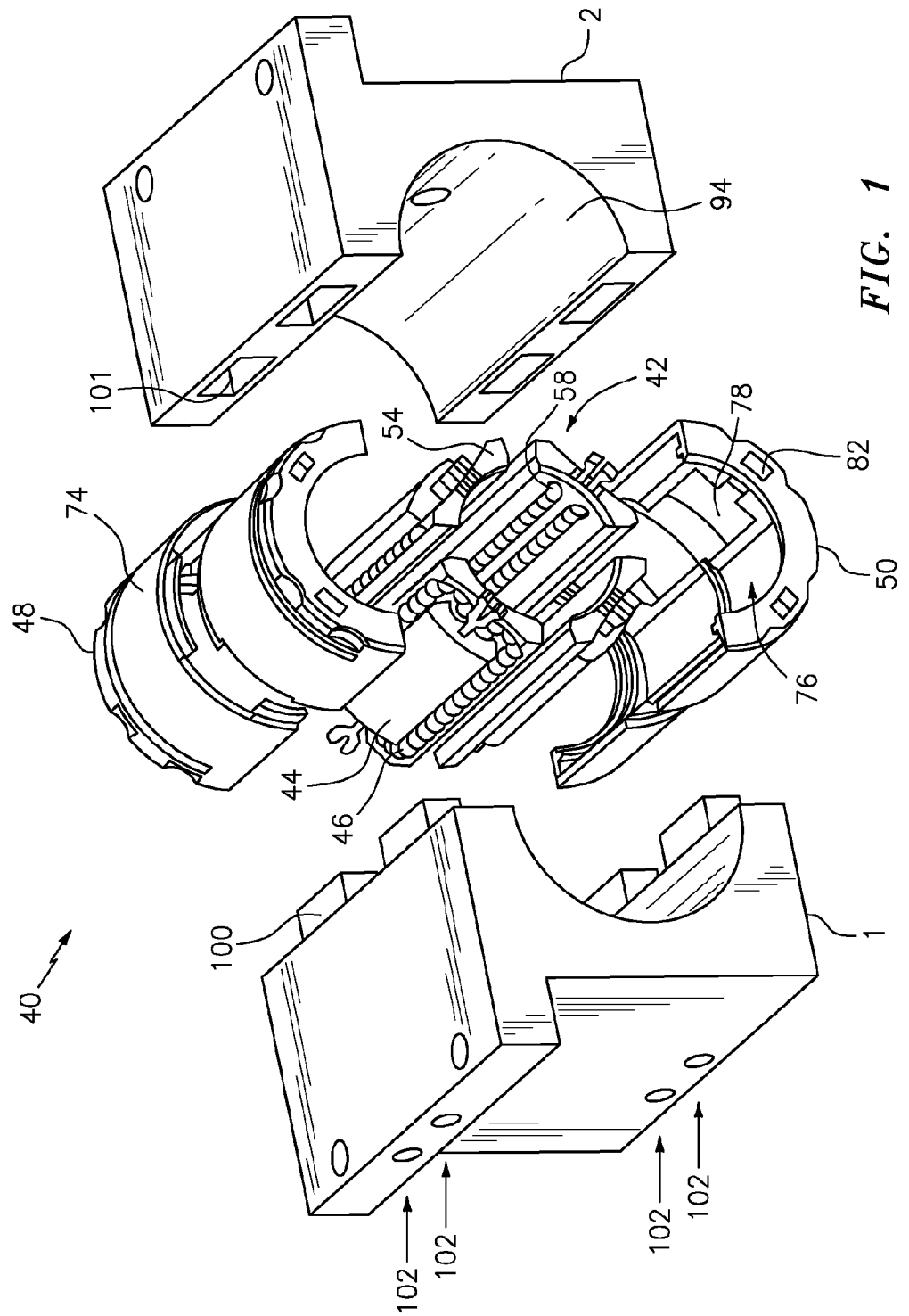
FIG. 1 is an exploded perspective view of a clam shell linear motion bearing assembly in accordance with an embodiment of the present invention.
Figure 3:
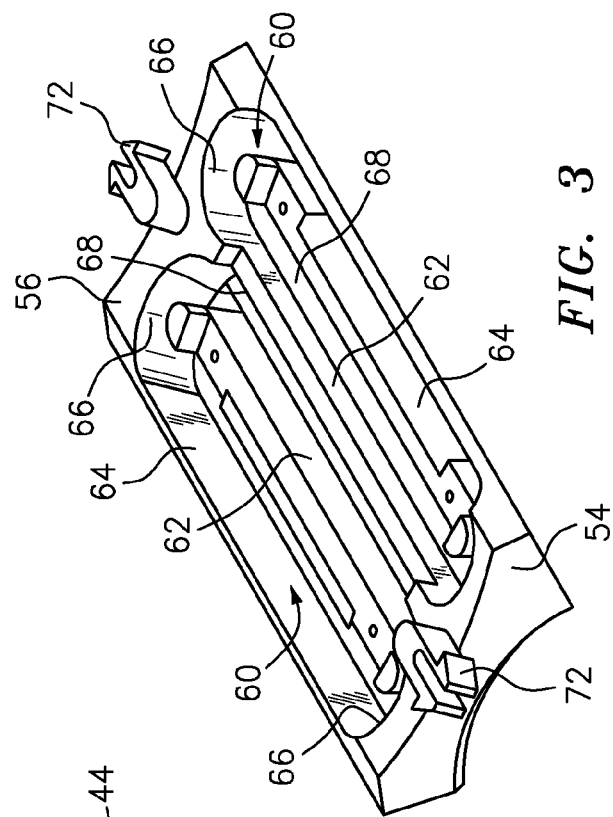
FIG. 3 is a perspective view of a rolling element retainer segment in accordance with the linear motion bearing assembly of FIG. 1.
Figure 2:
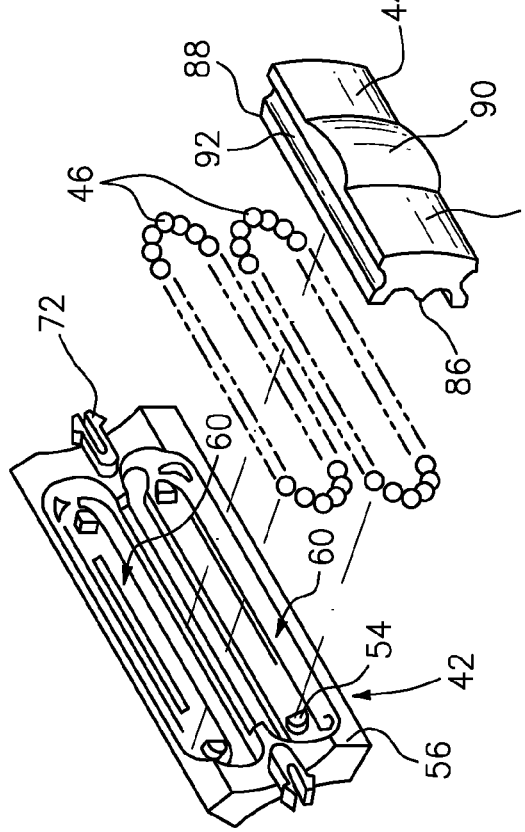
FIG. 2 is a perspective view of a rolling element retainer segment in accordance with the linear motion bearing assembly of FIG. 1.
Figure 5:
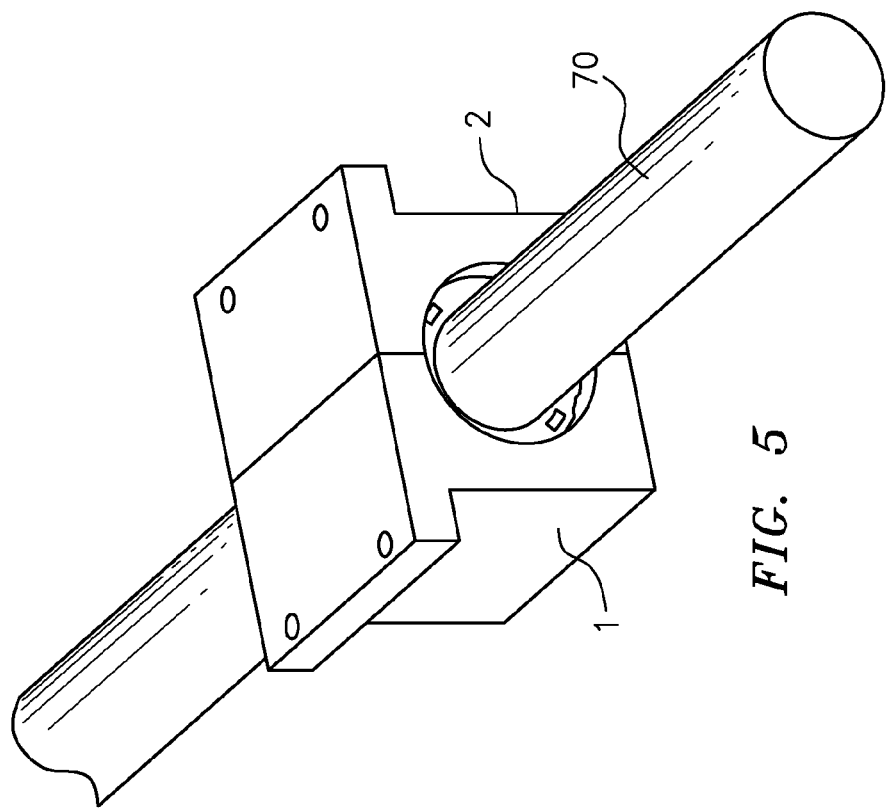
FIG. 5 is a perspective view of the clam shell linear motion bearing assembly in an assembled configuration in accordance with an embodiment of the present invention.
Figure 4:
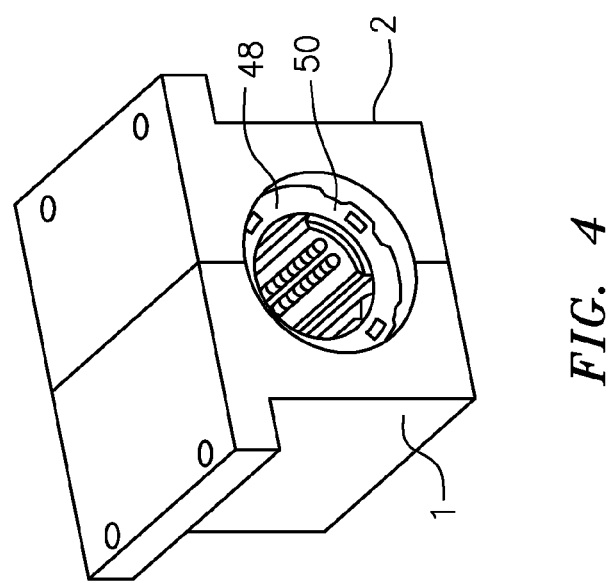
FIG. 4 is a perspective view of the clam shell linear motion bearing assembly in an assembled configuration in accordance with an embodiment of the present invention.

Various embodiments of the invention are described hereinafter with reference to the figures. Elements of like structures or function are represented with like reference numerals throughout the figures. The figures are only intended to facilitate the description of the invention or as a guide on the scope of the invention. In addition, an aspect described in conjunction with a particular embodiment of the invention is not necessarily limited to that embodiment and can be practiced in conjunction with any other embodiments of the invention.

Referring to FIGS. 1-6, there is shown a clam shell linear motion bearing assembly 40 in accordance with an embodiment of the present invention. Bearing assembly 40 includes a load bearing plate structure, shown generally at 42, load bearing plates 44, bearing rolling elements 46, outer housing sleeves 48, 50 and bearing blocks 1, 2.

In FIG. 1-5 details of the load bearing plate structure 42 are illustrated. Load bearing plate structure 42 comprises four rolling element retainer segments 54, each operatively associated with adjacent rolling element retainer segments 54 along longitudinal sides thereof to form a polygonally shaped load bearing plate structure 42 having a bore therethrough for receiving a shaft or rail 70. Each rolling element retainer segment 54 includes an outer radial surface 56 and an inner radial surface 58. Axial rolling element tracks 60 are formed in the outer radial surface 56 of each rolling element retainer segment 54 and include load bearing portions 62, return portions 64 and turnarounds 66. The load bearing and return portions of the rolling element tracks in this embodiment are undercut to facilitate loading and retention of the bearing rolling elements 46 therein. This also eliminates the need for separate retainer structure to keep the bearing rolling elements in the rolling element tracks. A longitudinal bore 68 in the inner radial surface 58 of the rolling element retainer segment 54 extends substantially the length of the load bearing portions 62 and accesses support shaft 70. Although support shaft 70 is illustrated as a substantially cylindrical shaft, other configurations may also be used.

Rolling element retainer segments 54 may be easily molded from an appropriate engineering plastic. By individually forming each of the rolling element retainer segments, the molding process is greatly simplified and thus results in a lower cost to produce. Rolling element bearing segments may be created from an engineering metal.

Bearing rolling elements 46 in load bearing tracks 62 extend at least partially into longitudinal bores 68 to contact support shaft 70. In this embodiment, a pair of axial rolling element tracks 60 is formed in each outer radial surface 56 of the rolling element retainer segment with the corresponding load bearing tracks being oriented in substantially parallel adjacent relation. This orientation facilitates enhanced load capacity and maximizes space utilization for a more compact and efficient bearing rolling element arrangement. Locking structure in the form of locking clips 72 are formed on opposing longitudinal ends of each rolling element retainer segment 54 to facilitate assembly with outer housing sleeves 48, 50.

The load bearing plate structure 42 described herein relates to a dual track configuration. Other configurations may be used. For example, a single track load bearing plate structure may be used as is described in U.S. Pat. Nos. 5,346,313 and 5,558,442, the entire disclosures of which are hereby incorporated by reference. Additional examples of other track load bearing plate structures are described in U.S. provisional application Ser. No. 61/364,525 the entire disclosure of which is hereby incorporated by reference. For a further example, a half bearing segment load bearing plate structure may also be used as described in U.S. Pat. No. 6,908,228, the entire disclosure of which is hereby incorporated by reference.

The linear motion bearing assembly in accordance with one embodiment includes a pair of outer housing sleeves 48, 50 which, when assembled define a cylinder in cross-section and serve to close and protect the exposed outer radial surfaces 56 of load bearing plate structure 42. Outer housing sleeves 48, 50 may be identical in configuration and are configured such that any one outer housing sleeve can securely mate with any other outer housing sleeve. Each of sleeves 48, 50 may be molded from an engineering plastic to facilitate ease of manufacture and assembly. However, the sleeves may be made in differing configurations and/or from engineering metals.

The outer radial surface 74 of sleeves 48, 50 may be of a smooth cylindrical shape and are configured and dimensioned to fit within bearing blocks 1, 2. The inner radial surface 76 of sleeves 48, 50 include mounting surfaces 78 which are configured to receive at least a portion of load bearing plates 44 therein.

Mounting surfaces 78 are configured to fit the shape of individual rolling element retainer segments 54. A plurality of locking bores 82 are formed in respective ends of sleeves 48, 50 in alignment with locking clips 72 of rolling element retainer segments 54. Thus, when the rolling element retainer segments 54 are assembled into the sleeves 48, 50, locking clip 72 extends into respective locking bores 82 and assists in holding linear motion bearing assembly 40 together.

A plurality of individual load bearing plates 44 are incorporated into the linear motion bearing assembly 40 and serve to receive load from the bearing rolling elements 46 in contact with shaft 70. Load bearing plate 44 is elongated along the longitudinal axis of the bearing assembly and includes an outer radial surface 84, an inner radial surface 86, and a pair of side wall surfaces 88. The outer radial surface 84 is substantially arcuate and includes a crown portion 90 disposed on the outer radial surface 84 in a medial position. Crown portion 90 is configured and dimensioned to permit the load bearing plates to rock both circumferentially and longitudinally into and out of parallelism with the axes of the rolling element retainer 42.

The inner radial surface 86 of the load bearing plate of this embodiment may be provided with a pair of axial grooves which serve as the upper surface of load bearing portions 62 of rolling element tracks 60. By providing a single load bearing plate 44 for each pair of load bearing portions 62 in each outer radial surface 56, the linear motion bearing assembly 40 is easier to fabricate and assemble. Further, the bearing assembly has a high load bearing capacity.

In this embodiment, a longitudinal groove 92 is formed in each side wall surface 88 of load bearing plates 44. These grooves 92 make up a side wall of the axial rolling element tracks 60 and guide bearing rolling elements 46 as they move through the return portion thereof.

Bearing blocks 1, 2 are illustrated having an inner radial surface 94 conforming substantially in dimension to the outer radial surface 74 of sleeves 48, 50. Bearing blocks 1, 2 have a plurality of mortises 101 and tenons 100 that interlock with each other. That is, a male portion 100 that fits within a female portion 101 to interlock. The configuration of the mortises 101 and tenons 100 can vary, for example, the mortises 101 and tenons 100 can be configured such that each bearing block is identical and can mate with each other bearing block. One such example is shown for linear bearing 200 in FIG. 6. Tie rod holes 102 may be bored through each bearing block and can be used to provide additional strength to the bearing blocks 1, 2 to prevent the bearing blocks 1, 2 from opening.

Figure 6:
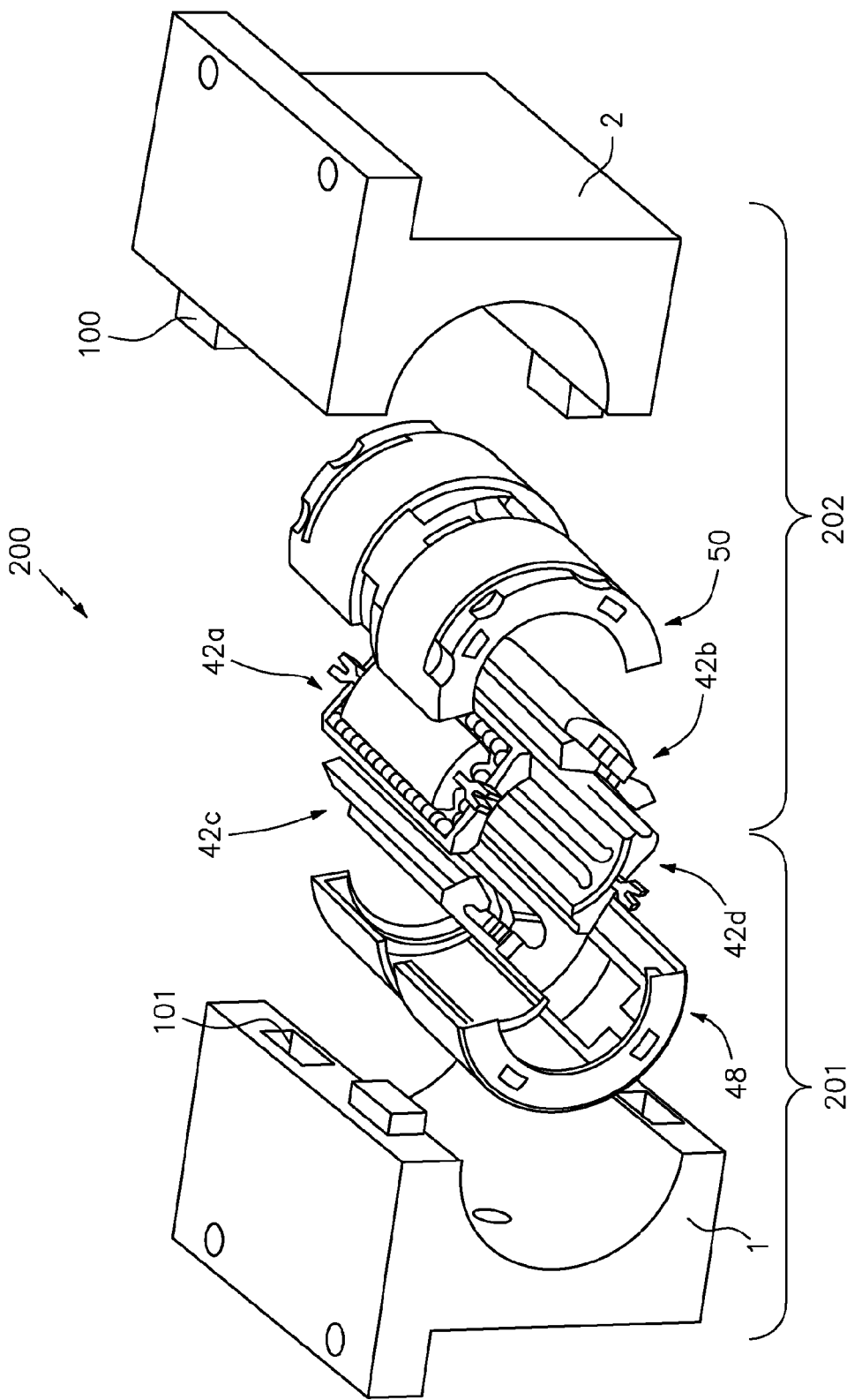
FIG. 6 is an exploded perspective view of a clam shell linear motion bearing assembly in accordance with an embodiment of the present invention.
Figure 6A:
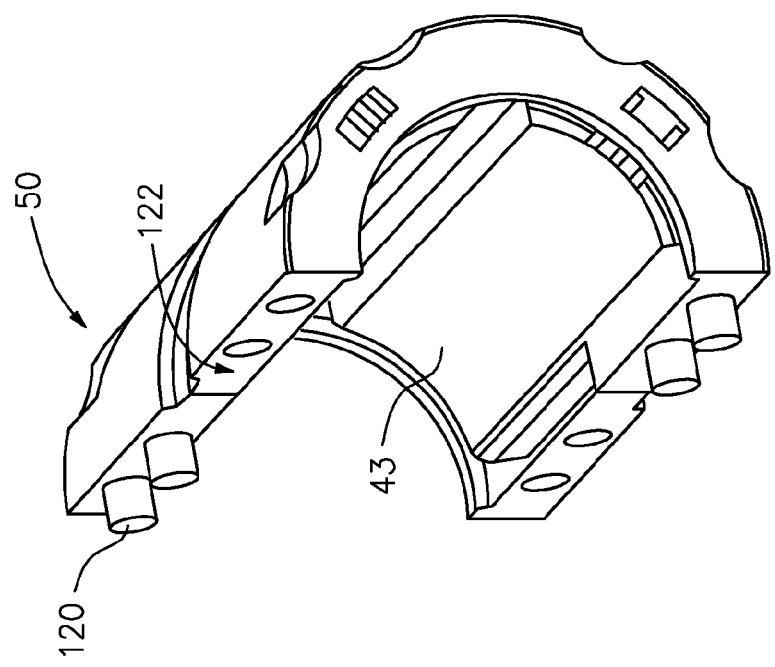
FIG. 6A is an exploded perspective view of a clam shell linear motion bearing assembly in accordance with an embodiment of the present invention.
Figure 6A:
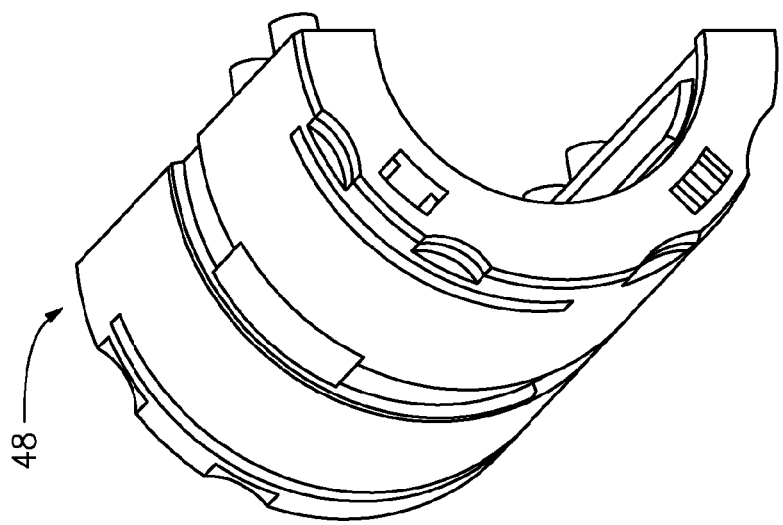

As shown in FIG. 6, bearing blocks 1, 2, sleeves 48, 50 and load bearing plate structures 42a, 42b, 42c, 42d are aligned along a horizontal axis thus creating 2 identical structures defined along the vertical axis. Thus, bearing block 1, sleeve 48 and load bearing plate structures 42c, 42d form one-half 201 of a clam shell linear motion bearing assembly 200, and bearing block 2, sleeve 50 and load bearing plate structures 42a, 42b form another half 202 of clam shell linear motion bearing assembly 200. Each half 201, 202 is identical and is configured to interlock with each other. As shown in FIG. 6A, sleeve 48 and/or sleeve 50 may include cylindrical protuberances 120 and/or recesses 122 to help facilitate mating of sleeve 48 with sleeve 50. FIG. 6A also shows an example where plain sliding contact 43 may be used.

Figure 7:
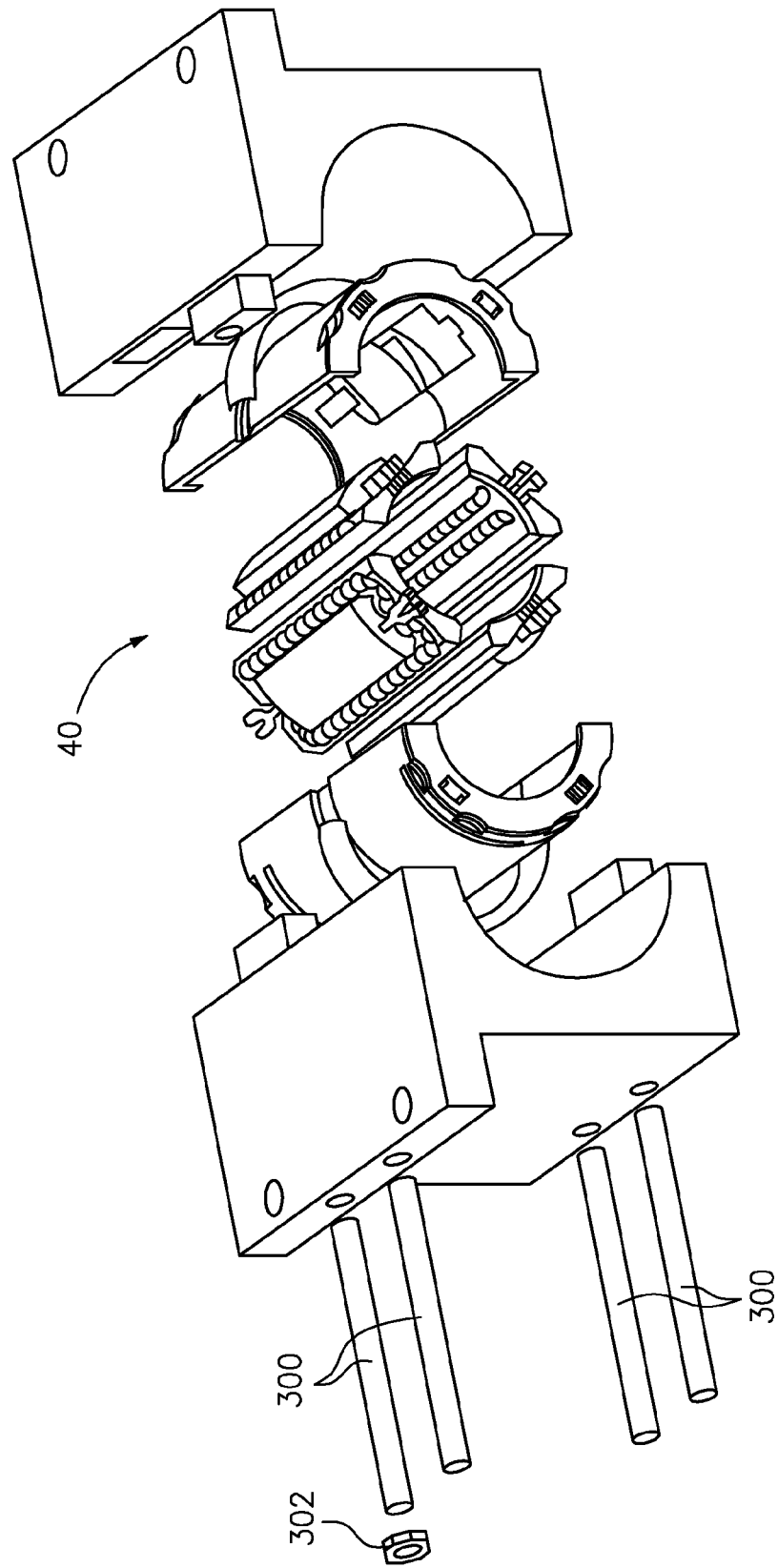
FIG. 7 is an exploded perspective view of a clam shell linear motion bearing assembly in accordance with an embodiment of the present invention.
Figure 8:
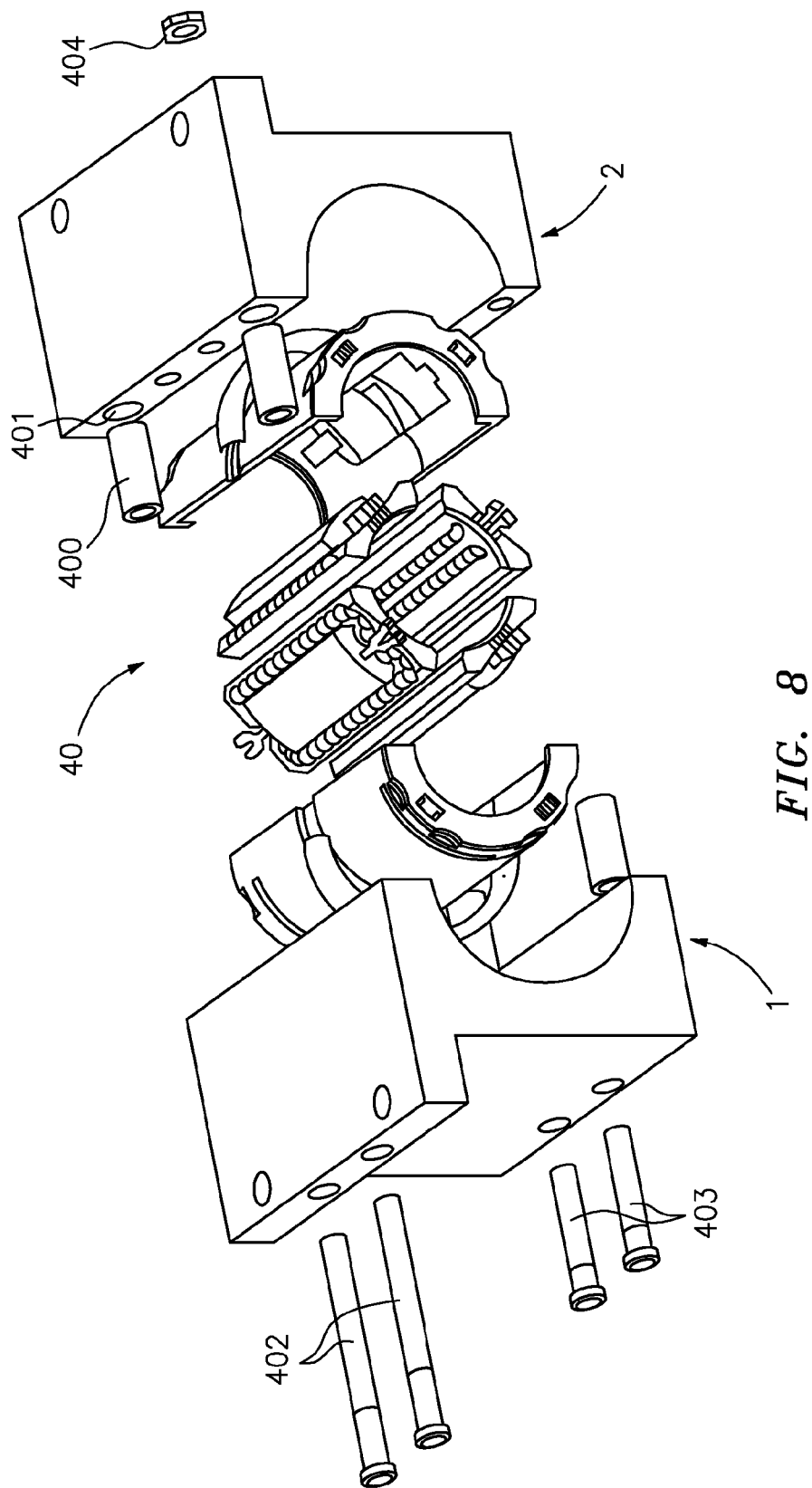
FIG. 8 is an exploded perspective view of a clam shell linear motion bearing assembly in accordance with an embodiment of the present invention.

FIGS. 7 and 8 illustrate other designs for interlocking bearing blocks 1, 2. In FIG. 7, tension rods 300 provide secure interlocking. Each tension rod can be inserted through the assembled bearing blocks 1, 2. The tension rods can be threaded and nuts 302 applied to each end to secure the bearing blocks 1, 2 in place. In FIG. 8, dowel pins 400 are used to interlock bearing blocks 1, 2. Bearing pins 400 are inserted into holes 401. Holes 401 are located on each bearing block 1, 2 and one bearing pin is used for two mating holes. In addition, cap screws 402, 403 can be used in place of tension rods 300. A threaded end of each cap screw is inserted into bearing blocks 1, 2. Nuts 404 can be used to secure cap screws 402, 403. Bearing blocks 1, 2 can include threads to secure cap screws 402, 403. Although the configuration illustrated in FIG. 8 shows all cap screws entering from one side of bearing blocks 1, 2, a configuration wherein two alternating cap screws can be inserted into each bearing block to create two identical halves (i.e. no left or right halves) including one bearing block and two cap screws may be used. Other systems for interlocking bearing blocks 1, 2 may be used.

The bearing blocks 1, 2 may be formed of a hard abrasion resistant material such as, for example, stainless steel or ceramic. Alternatively, a softer material such as bronze or aluminum may also be used.

Various seals and/or wiper structure may be incorporated into the bearing assembly to inhibit the ingress of dust, dirt or other contaminants. See, for example, U.S. Pat. No. 3,545,826 to Magee et al., the disclosure of which is incorporated herein by reference.

Figure 9:
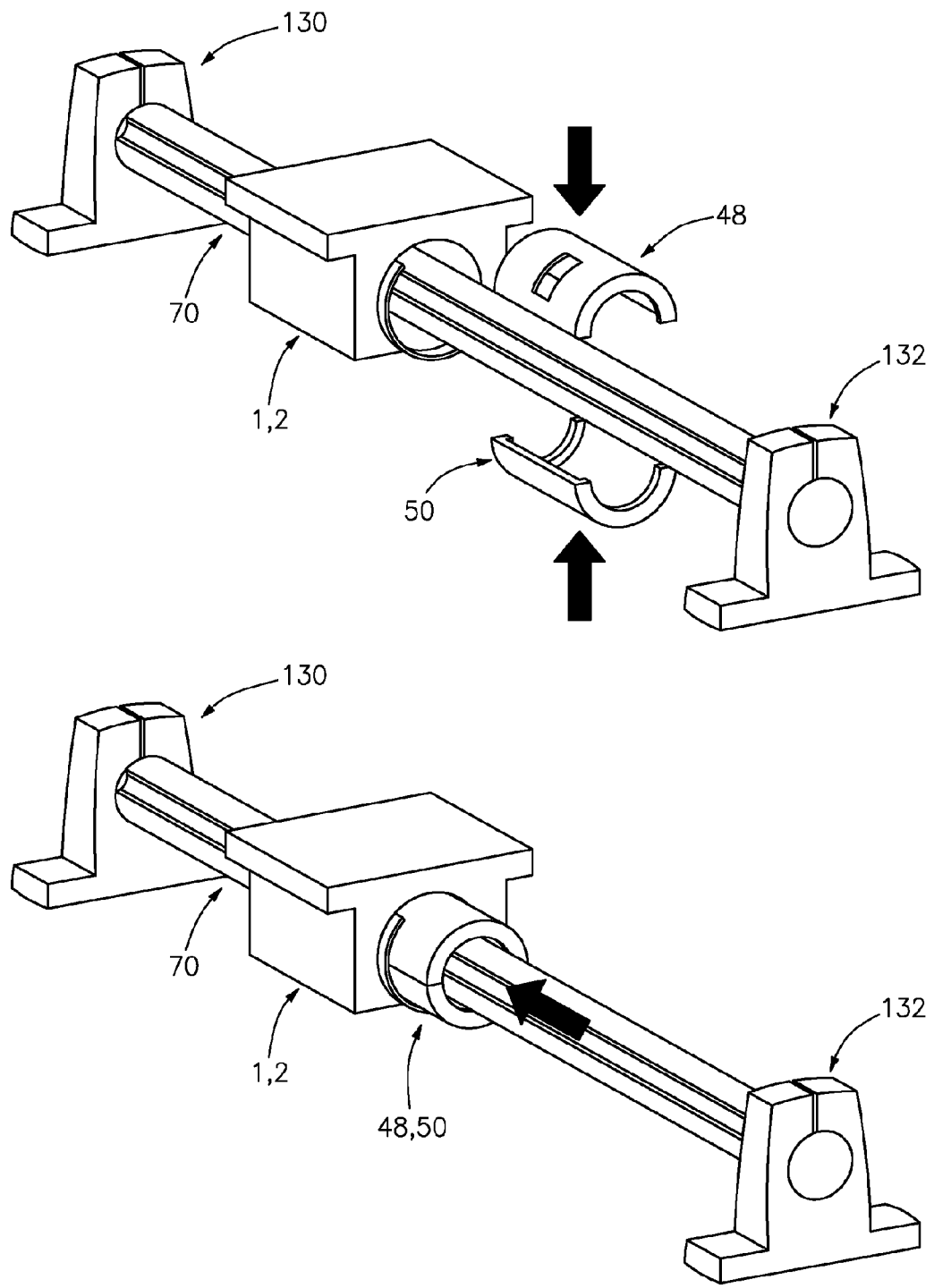
FIG. 9 is a perspective view showing assembly and disassembly of a clam shell linear motion bearing assembly in accordance with an embodiment of the present invention.

As shown in FIG. 9, among other potential benefits, a linear bearing in accordance with the disclosure may be installed and removed from a shaft without requiring that the bearing be moved off the end of the shaft. The shaft thus need not be removed from shaft supports 130, 132 to replace a bearing. System realignment and assembly time may be reduced. A lower system envelope may be achieved as space is not needed on ends of the rail to remove a bearing.

While the invention has been described with reference to a number of exemplary embodiments, it will be understood by those skilled in the art that various changes can be made and equivalents can be substituted for elements thereof without departing from the scope of the invention. In addition, many modifications can be made to adapt a particular situation or material to the teachings of the invention without departing from essential scope thereof. Therefore, it is intended that the invention not be limited to any particular exemplary embodiment disclosed herein.

What is claimed is:
1. A linear motion bearing assembly comprising:
 a rolling element retainer structure, the rolling element retainer structure including a plurality of rolling element retainer segments, each of the rolling element retainer segments including
 an inner portion defining at least one rolling element track having an open load bearing portion, an open return portion, and turnarounds interconnecting the load bearing and return portions,
 a plurality of bearing rolling elements disposed in the rolling element tracks, the rolling elements effective to transmit a load from a shaft to load bearing plates and facilitate a movement of the linear motion bearing assembly along the shaft, and the load bearing plates axially positioned adjacent each rolling element retainer structure, the load bearing plates effective to receive a load from the rolling elements disposed in the load bearing portion of the rolling element tracks; an outer housing sleeve enclosing substantially all of an exposed exterior surface of the rolling element retainer structure, having an inner surface in direct contact with the load bearing plates and configured and dimensioned to maintain the load bearing plates in position and effective to receive load from the load bearing plates, the outer housing sleeve including
  a first sleeve portion including a first number of the rolling element retainer segments; and
  a second sleeve portion including a second number of the rolling element retainer segments;
wherein the first sleeve portion is effective to mate with the second sleeve portion to form the outer housing sleeve;
further comprising:
a bearing block effective to enclose substantially all of an exposed exterior surface of the outer housing sleeve, the bearing block including
  a first bearing block segment effective to enclose a first part of the outer housing sleeve; and
  a second bearing block segment effective to enclose a second part of the outer housing sleeve;
wherein the first bearing block segment and the second bearing block segment include first elements and second elements effective to interlock with each other when the bearing block encloses the outer housing sleeve; and
the first element includes a mortise and the second element includes a tenon.

2. The linear motion bearing assembly as recited in claim 1, wherein the first and second sleeve portions are substantially identical.

3. The linear motion bearing assembly as recited in claim 1, wherein the bearing block segments are made of stainless steel, ceramic, bronze or aluminum.

4. The linear motion bearing assembly as recited in claim 1, further comprising a shaft, where the rolling element retainer segments are effective to move along the shaft.

5. The linear motion bearing assembly as recited in claim 1, wherein:
the first and second sleeve portions have a first exterior cross-section;
the bearing block segments include a second interior cross-section; and
the first cross-section section is sized and shaped so as to mate with the second cross-section.

6. The linear motion bearing assembly as recited in claim 5, wherein the first and second cross-sections each define a cylinder.

7. A linear motion bearing assembly comprising:
a rollinq element retainer structure, the rollinq element retainer structure including a plurality of rolling element retainer segments, each of the rolling element retainer segments including
an inner portion defining at least one roiling element track having an open load bearing portion, an open return portion, and turnarounds interconnecting the load bearing and return portions,
a plurality of bearing rollinq elements disposed in the rolling element tracks, the rollinq elements effective to transmit a load from a shaft to load bearing plates and facilitate a movement of the linear motion bearing assembly along the shaft, and the load bearing plates axially positioned, adjacent each rolling element retainer structure, the load bearing plates effective to receive a load from the rolling elements disposed in the load bearing portion of the rolling element tracks; an outer housing sleeve enclosing substantially all of an exposed exterior surface of the rolling element retainer structure, having an inner surface in direct contact with the load bearing plates and configured and dimensioned to maintain the load bearing plates in position and effective to receive load from the load bearing plates, the outer housing sleeve including
  a first sleeve portion includist number of the rolling element retainer segments; and
  a second sleeve portion including a second number of the rolling element retainer segments; wherein
the first sleeve portion is effective to mate with the second sleeve portion to form the outer housing sleeve;
further comprising:
a bearing block effective to enclose substantially all of an exposed exterior surface of the outer housing sleeve, the bearing block including
  a first bearing block segment effective to enclose a first part of the outer housing sleeve; and
  a second bearing block segment effective to enclose a second part of the outer housing sleeve;
wherein the first bearing block segment and the second bearing block segment include first elements and second elements effective to interlock with each other when the bearing block encloses the outer housing sleeve; and
the first bearing block includes walls defining holes effective to receive a tie rod.

8. A method of assembling a linear motion bearing assembly, the method comprising the steps of:
(i) placing a rolling element retainer structure in an outer housing sleeve,
the rolling element retainer structure including a plurality of rolling element retainer segments, each of the rolling element retainer segments including an inner portion defining at least one rolling element track having an open load bearing portion, an open return portion, and turnarounds interconnecting said load bearing and return portions, a plurality of bearing rolling elements disposed in the rolling element tracks, the rolling elements effective to transmit a load from a shaft to load bearing plates and facilitate a movement of the linear motion bearing assembly along the shaft, the load bearing plates axially positioned adjacent each rolling element retainer structure, the load bearing plates effective to receive a load from the rolling elements disposed in the load bearing portion of the rolling element tracks, the outer housing sleeve enclosing substantially all of an exposed exterior surface of the rolling element retainer structure, having an inner surface in direct contact with the load bearing plates and configured and dimensioned to maintain the load bearing plates in position and effective to receive load from the load bearing plates, the outer housing sleeve including
  a first sleeve portion including a first number of the rolling element retainer segments; and
  a second sleeve portion including a second number of the rolling element retainer segments;
wherein the first sleeve portion is effective to mate with the second sleeve portion to form the outer housing sleeve;

(ii) placing the outer housing sleeve in a bearing block to enclose substantially all of an exposed exterior surface of the outer housing sleeve, the bearing block including a first bearing block segment effective to enclose a first part of the outer housing sleeve; and
a second bearing block segment effective to enclose a second part of the outer housing sleeve,
wherein the first bearing block segment and the second bearing block segment include first elements and second elements effective to interlock with each other when the bearing block encloses the outer housing sleeve, the first element including a mortise and the second element including a tenon; and
(iii) mating the mortise and tenon of the respective first and second beating block segments.

9. The method as recited in claim 8, further the step of comprising sliding the outer housing sleeve into an inside of the bearing block.

10. The method as recited in claim 8, wherein the rolling element retainer segments are effective to move along a shaft; and the method further comprises the steps of:
sliding the outer housing along the shaft and out of the bearing block; and
removing the outer housing while maintaining the bearing block on the shaft.

\* \* \* \* \*